(No Model.)

R. N. ALLEN.
GEAR WHEEL.

No. 315,214.  Patented Apr. 7, 1885.

Witnesses:
Henry Eichling
Robt. H. Duncan

Inventor
Richard N. Allen
by Paul A. Duncan
atty

UNITED STATES PATENT OFFICE.

RICHARD N. ALLEN, OF CLEVELAND, OHIO.

GEAR-WHEEL.

SPECIFICATION forming part of Letters Patent No. 315,214, dated April 7, 1885.

Application filed December 26, 1884. (No model.)

*To all whom it may concern:*

Be it known that I, RICHARD N. ALLEN, of the city of Cleveland, in the county of Cuyahoga and State of Ohio, have invented a new and useful Improvement in Gear-Wheels, of which the following is a specification.

Gear-wheels furnish reliable means for transmitting power, and are especially advantageous when it is necessary to change the direction in which the power is to act. An objection, however, to the use of such wheels when made wholly of metal, as is generally the case, is the noise caused by the free vibration of the wheel, and this often becomes so annoying as to compel resort to the use of bands or other less desirable means of connection and communication.

It is the object of the present invention to provide a gear-wheel which shall possess the essential advantages of such wheels when made entirely of metal, and at the same time shall be of such construction that the vibration of the metal parts will be largely prevented or interrupted, and the resulting noise greatly lessened; and to this end my invention consists in making the center or body of the wheel, the part intermediate of the circular metal rim carrying the gears and the circular hub, of compressed paper or equivalent non-sonorous material.

Figure 1:
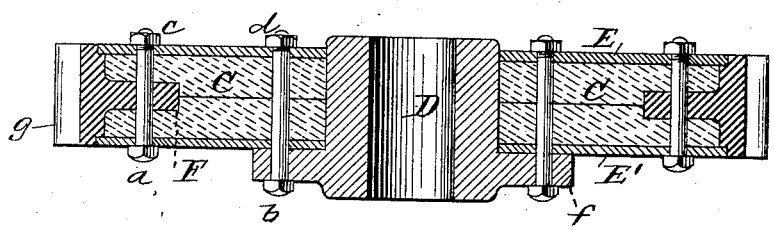
Figure 2:
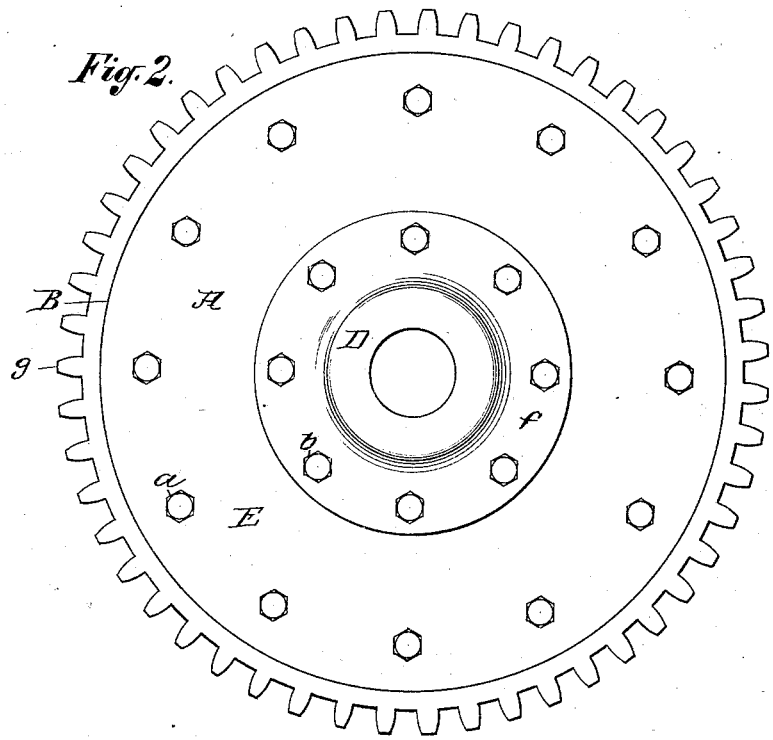
Figure 3:
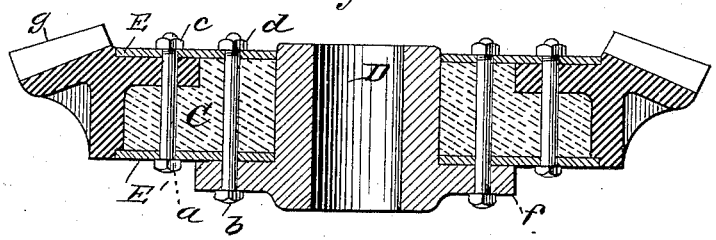

The invention is illustrated in the accompanying drawings, in which Figure 1 is a central cross-section of a gear-wheel containing my invention. Fig. 2 is a plan view of one side of the same, and Fig. 3 is a view in cross-section of a similar wheel provided with a bevel-gear.

In the drawings, A represents a gear-wheel composed of the following-named parts: a rim or tire, B, upon which is formed gears $g$; a center or body, C; a hub, D, provided with a flange, $f$, side plates, E E', and series of bolts $a$ and $b$, and corresponding series of nuts, $c$ and $d$, by which the several parts are held in place.

The rim B, carrying the proper number, size, and shape of gears for the desired purpose, may be formed by casting or by any of the other usual ways, and from any of the metals—as steel, iron, or brass—adapted for this purpose. The hub D and side plates, E E', may also be of any suitable metals to give the required strength and durability, it being preferred that the side plates be made of steel or wrought-iron. The center or body C is preferably made of compressed paper, which, by reason of its great strength, stiffness, and durability, as well as its non-sonorous property and its capacity for interrupting and limiting the vibrations of the metal parts in contact with it, is well adapted for this purpose. Other fibrous non-metallic material having the requisite strength, as well as the capacity to obstruct and deaden the sound, may be substituted for compressed paper—as, for example, thin layers of wood superimposed upon each other in such way as to cross the grains of the layers, or several thicknesses of leather pressed together may be employed for the central portion or body of the wheel. The center C may be formed into one or more blocks or pieces, which shall fill the space between the hub and the rim radially and between the side plates laterally, according to the special construction of the wheel, and the special means adapted to secure the rim to the body. For example, if the union is to be effected by bolting through a web, F, projecting from the central part of the rim toward the hub, the center is conveniently constructed in two blocks or pieces, as shown in Fig. 1 of the drawings. If, however, the rim-web is so located as to fall upon one side of the center or body or into a rabbet formed upon one of its sides, the center in such case is preferably of a single block or piece, as shown in Fig. 3.

When the wheel is made of several parts, as above described, and shown in the drawings, the center or body C should be made to fit with great closeness against the hub on the one hand and against the rim on the other, and the side plates should also be forced and held in close contact with the adjacent parts of the center or body. The object of this is not only to insure strength, and to prevent any movement of the parts upon each other, but also to largely absorb and limit the vibration of the metal parts by reason of their constant and close contact with the non-metallic center or body.

The desired intimate union of the several parts can be attained by giving them their proper relative size and shape and forcing them into place by hydraulic or other powerful pressure.

The bolt-holes are conveniently made after the parts have been forced into place, when the bolts are inserted and drawn home, and secured by their nuts.

It is observed of the styles of wheels above described, and shown in the drawings, that the rims carrying the gears can at any time be readily removed whenever for any reason it is desired to substitute a rim of different gearing, or whenever the old one shall become worn out or broken, and this can be done without essential injury to the wheel.

While it is considered that the construction of the gear-wheels which has been specially above described is such as to give the best results in strength and durability, combined with noise-quieting capacity, it is nevertheless true that the center or body of compressed paper or other equivalent material may be united with the rim and the hub in many other ways from those above described and shown with substantially the same results. I do not, therefore, limit my invention to these special constructions, or to any special ways of uniting the parts that make up the wheel, or to any special number of parts, as the hub and the side pieces, or at least one of them, may be cast or formed in a single piece; but I consider my invention to consist, broadly, of a wheel provided with metal gears and a center or body of compressed paper or equivalent material.

Gear-wheels containing this improvement are especially adapted for the transmission of power from a motor or storage-battery placed on a street or other car to the axles of the car. It is very desirable in such cases to transmit the power with the least possible noise.

I am aware that gear-wheels have been made having an internally-scalloped toothed rim and a corresponding externally-scalloped hub with a non-sonorous cushion between such scalloped surfaces; but such a wheel I do not claim.

What is claimed as new is—

A gear-wheel composed of a rim provided with metal gears and a web projecting inwardly from its inner face, a hub, side plates, and a center or body of compressed paper or equivalent non-sonorous material, the several parts being secured together substantially as and for the purpose described.

RICHARD N. ALLEN.

Witnesses:
ROBT. H. DUNCAN,
R. F. GAYLORD.